United States Patent [19]
Gray

[11] Patent Number: 5,253,669
[45] Date of Patent: Oct. 19, 1993

[54] CONTROLLING PROCESS GAS FLOW

[75] Inventor: Tommy L. Gray, Dallas, Tex.

[73] Assignee: Span Instruments, Inc., Plano, Tex.

[21] Appl. No.: 872,407

[22] Filed: Apr. 23, 1992

[51] Int. Cl.[5] .................... G05D 16/02; G05D 16/20
[52] U.S. Cl. .................................. 137/14; 137/487.5; 137/906
[58] Field of Search ............... 137/488, 102, 12, 906, 137/505, 505.14, 14, 487.5

[56] References Cited

U.S. PATENT DOCUMENTS

| | | | |
|---|---|---|---|
| 1,869,791 | 8/1932 | Wright | 137/102 |
| 2,261,364 | 11/1941 | Grove | 137/906 X |
| 2,587,728 | 4/1952 | Hoskins | 137/906 |
| 3,858,598 | 1/1975 | Carman et al. | 137/107 |
| 4,253,480 | 3/1981 | Kessel et al. | 137/102 |
| 4,901,758 | 2/1990 | Cook et al. | 137/487.5 |
| 4,961,441 | 10/1990 | Salter | 137/487.5 X |
| 5,020,564 | 6/1991 | Thoman et al. | 137/102 |

Primary Examiner—Stephen M. Hepperle
Attorney, Agent, or Firm—Harold E. Meier

[57] ABSTRACT

A method and apparatus for controlling the pressure to the bonnet of a pressure regulator, wherein two solenoid valves in combination with a buffer tank and a microprocessor to control the solenoid valves. When the pressure within the regulator bonnet exceeds a specified maximum value, one of the solenoid valves opens to allow the control pressure going to the regulator bonnet to be decreased. When the pressure in the regulator bonnet falls below a preset minimum value, the other solenoid valve opens to allow increased control pressure to enter the regulator and raise the regulator bonnet pressure to the level required.

15 Claims, 6 Drawing Sheets

CONTROLLING PROCESS GAS FLOW

TECHNICAL FIELD

The present invention relates to the control of gas flow through a pressure regulator, and more particularly to the control of gas flow through a pressure regulator by a microprocessor responsive to feedback signals to selectively actuate solenoid valves in a control loop that includes a buffer tank.

BACKGROUND OF THE INVENTION

Heretofore, it has been recognized that to maintain substantially constant control pressure applied to a pressure regulator requires a complicated and expensive system. Various techniques have been employed to obtain the desired control all of which require the use of high cost, high precision components. One such prior system includes precisely controlling the input control pressure to a solenoid valve and the exhaust rate through an exhaust solenoid valve. This system requires continuous monitoring and pulsing of the solenoids for short periods of time until the desired pressure is achieved.

Due to the expense of precision solenoids and the precision control required to utilize lower cost solenoids, there has developed a need for control system that utilizes lower cost, less precise solenoids in a manner that does not require precision control. In accordance with the present invention, this goal is realized by a system using low cost solenoids in tandem with a buffer tank that acts as a pressure buffer. This system allows the low cost solenoids to act with the same effectiveness as high priced components.

SUMMARY OF THE INVENTION

In accordance with the present invention, there is provided a pressure regulator controller utilizing low cost solenoids connected to a tank that functions as a pressure buffer. The solenoids are controlled by a microprocessor that responds to input signals in accordance with a stored program. Outputs from the pressure regulator controller are applied to a pressure regulator, such as described in U.S. co-pending application Ser. No. 07/872,350 filed Apr. 23, 1992.

By using the tank as a pressure buffer, low cost solenoid valves function as effectively as higher cost precision solenoid valves. The effective higher performance and more repeatable reaction times of the solenoid valve/tank combination allows the solenoid valves to be opened and closed in a programmed sequence such that the tank reaches a desired value with a minimal and acceptable overshoot or undershoot.

The microprocessor of the controller opens and closes the solenoid valves in response to inputs received from sensors responding to flows and pressures to be controlled. The inputs to the microprocessor also include a plurality of push-button switches for setting operating conditions to be controlled by the pressure regulator controller of the present invention. The microprocessor also provides a continuous output display of controlled pressure by means of a digital display. Additional information is supplied by several external alarms.

In operation of the regulator controller of the present invention, if the regulator pressure is to be increased, a control pressure solenoid valve opens allowing the tank pressure and hence the output to the regulator to increase to the desired level. If the regulator pressure is to be decreased, an exhaust solenoid is opened and the excess pressure will be vented from the tank and decrease the regulator pressure.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
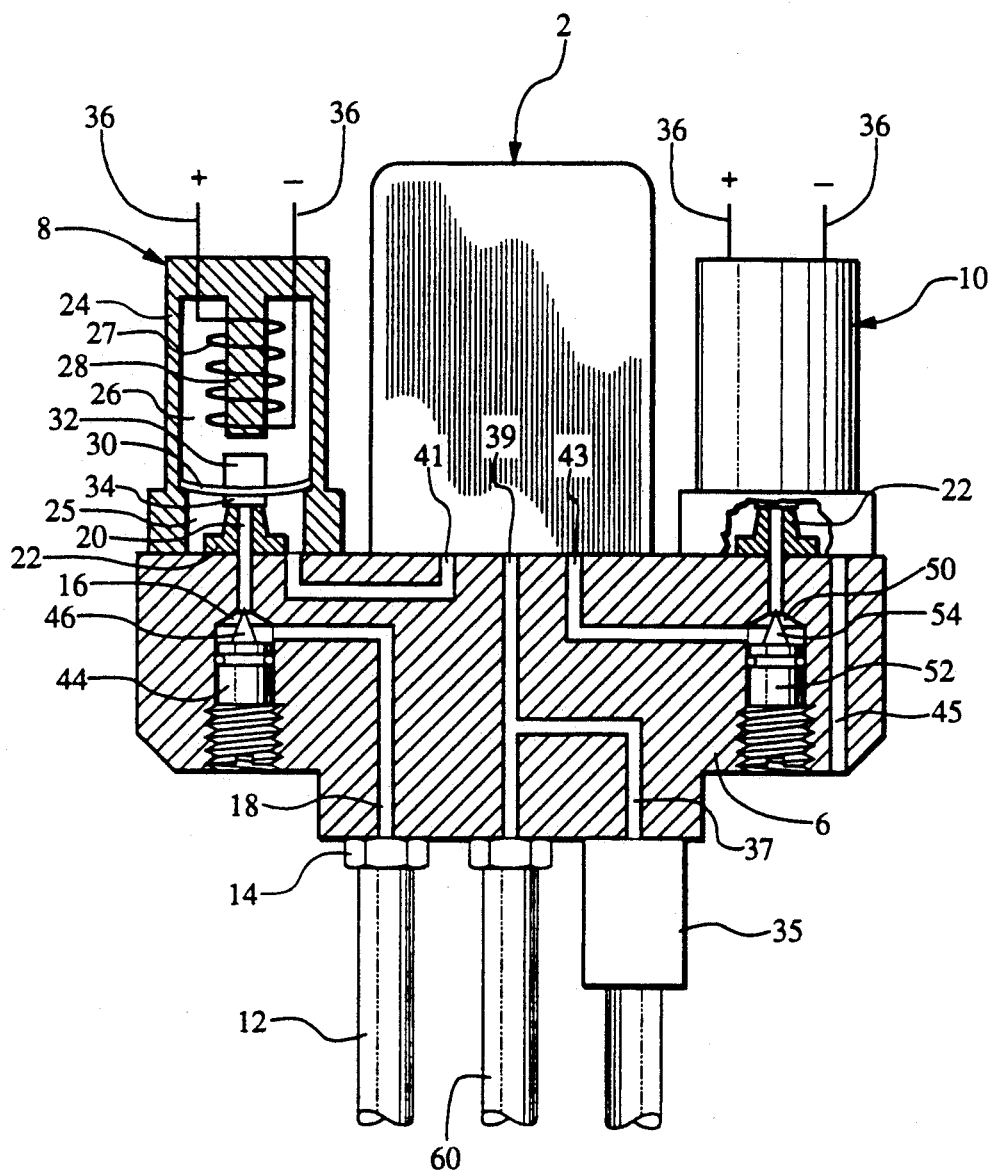
FIG. 1 is a partial cross-sectional diagram of the mechanical portion of the pressure regulator controller of the present invention.

Referring to FIG. 1, there is shown the regulator controller of the present invention including a cylindrical buffer tank 2 attached to a controller base 6. Also fastened to the controller base 6 are a control pressure solenoid valve 8 and an exhaust solenoid valve 10. A pressure source is attached to the controller by means of a pressure inlet line 12 which connects to the control base 6 at a connector 14. The connector 14 communicates with a control pressure valve chamber 16 by means of a passageway 18. From the control pressure valve chamber 16 the pressure applied to the controller base 6 enters the control pressure solenoid valve 8 by means of a passageway 20 extending through the controller base 6 and also extending through a pedestal 22 as the base of the control pressure solenoid 8.

The control pressure solenoid valve 8 and the exhaust solenoid valve 10 are selectively operated to increase or decrease the pressure in the buffer tank 2 and in turn a control pressure applied to a regulator. The control pressure solenoid valve 8 and the exhaust solenoid valve 10 each comprise an outer casing 24 surrounding an inner chamber 26. Inside the chamber 26 a magnetic core 28 extends from the top of the chamber 26. Within the base of the solenoid valve is the pedestal 22 with a lower base portion and a smaller diameter upper portion. The passageway 20 extendinq through the pedestal 22 terminates at a diaphragm 30. Centered on the upper surface of the diaphragm 30 is an armature 32 positioned by energization of a solenoid coil 27 surrounding the magnetic core 28. Between the diaphragm 30 and the pedestal 22 is a gasket 34 which seals the passageway 20 from an inner chamber 25 when the solenoid valve is in a closed position. Finally, each solenoid valve contains a control line 36 that carries the control signals from a control circuit for the controller.

Figure 2A:
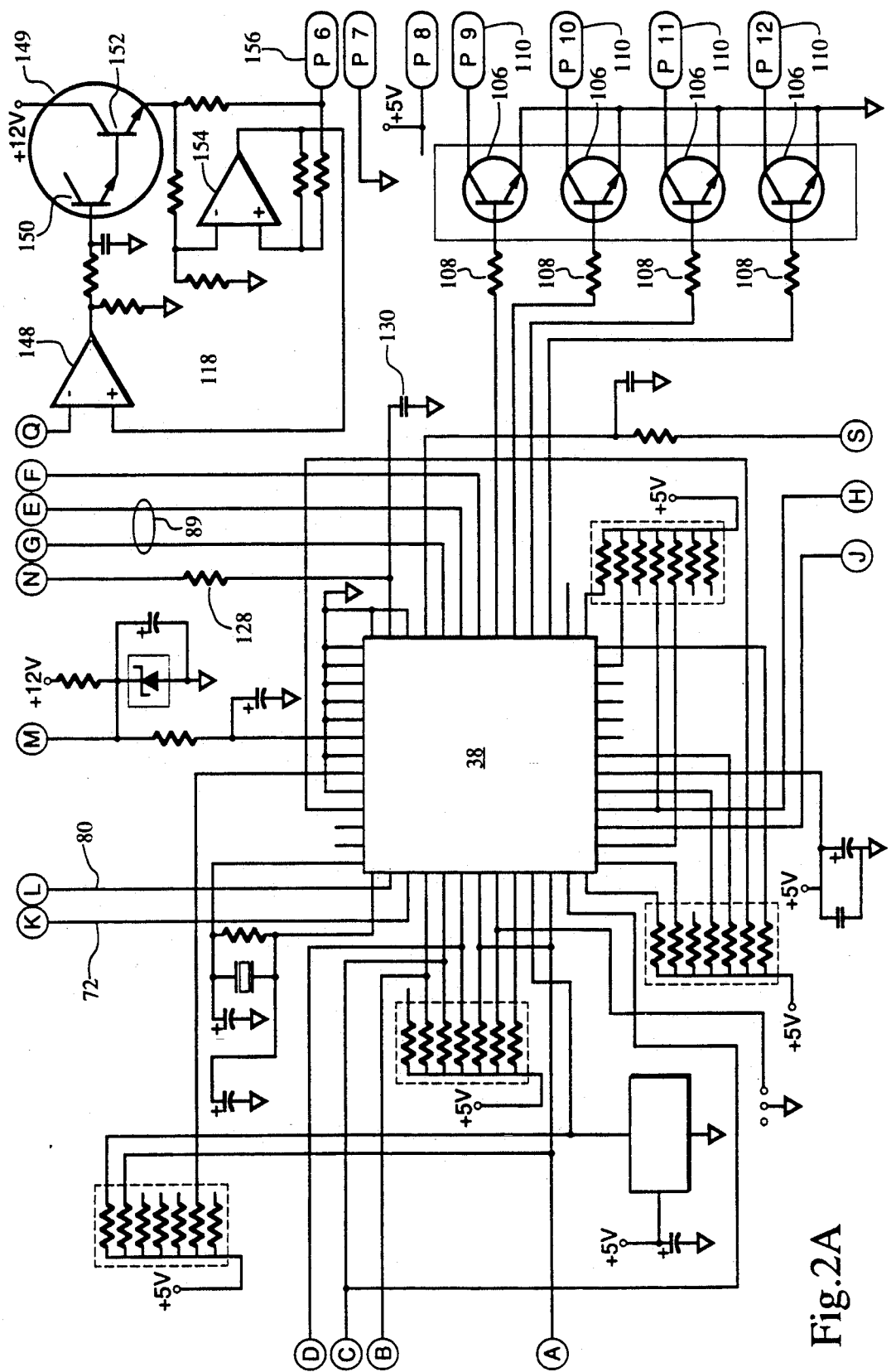
FIGS. 2A, 2B and 2C are a schematic drawing showing the microprocessor and associated circuitry for control of the solenoid valves of the controller of FIG. 1.

The buffer tank pressure is monitored by means of a pressure transducer 35 connected to the bottom of the controller base 6. The transducer 35 communicates with the buffer tank 2 by means of passageways 37 and 39 formed in the base 6 between the transducer 35 and the buffer tank 2. When the pressure at the controlled regulator is to be increased, the control pressure solenoid valve 8 receives a control signal from the microprocessor 38 (FIG. 2A). This signal energizes the solenoid coil 27 and creates a magnetic force between the valve armature 32 and the solenoid core 28. This causes the diaphragm 30 in the control pressure solenoid valve 8 to deflect upwards and allow the pressure to enter the pedestal 22 through two passageways 18, 20 leading from the control pressure inlet connector 14 to the control pressure solenoid valve 8. The applied pressure passes through the inner chamber 25 to a passageway 41 in communication with the buffer tank 2. The control pressure solenoid valve 8 remains open until the pressure in the buffer tank 2 reaches the desired level. The buffer tank pressure is also the pressure applied to the bonnet of the downstream pressure regulator.

When the pressure in the regulator bonnet, and in turn the buffer tank 2 is to be decreased, a signal is applied to the exhaust solenoid valve 10. This signal energizes the solenoid coil to magnetize the core 28 of the exhaust solenoid valve 10 thereby positioning the armature 32 connected to the diaphragm 30 in the exhaust solenoid valve 10. This causes the diaphragm 30 in the exhaust solenoid valve 10 to deflect upwards and open a passageway 43 from the buffer tank 2 through the exhaust solenoid valve 10 and the controller base 6 to be exhausted through a passageway 45 such that the excess pressure is vented from the buffer tank 2.

The control pressure valve chamber 16 associated with the control pressure solenoid valve 8 contains a screw valve 44 having a metering element 46. The valve 44 establishes the flow of pressure entering the control pressure solenoid valve 8. A similar exhaust valve chamber 50 associated with the exhaust solenoid valve 20 contains a screw valve 52 having a metering element 54. This valve 52 establishes the exhaust rate of pressure exhausted from the buffer tank 2.

Pressure within the buffer tank 2 is applied to the downstream regulator by means of a passageway 39 in the controller base 6 through a regulator bonnet line 60. This line 60 applies the buffer tank pressure to the regulator bonnet (not shown).

Figure 2B:
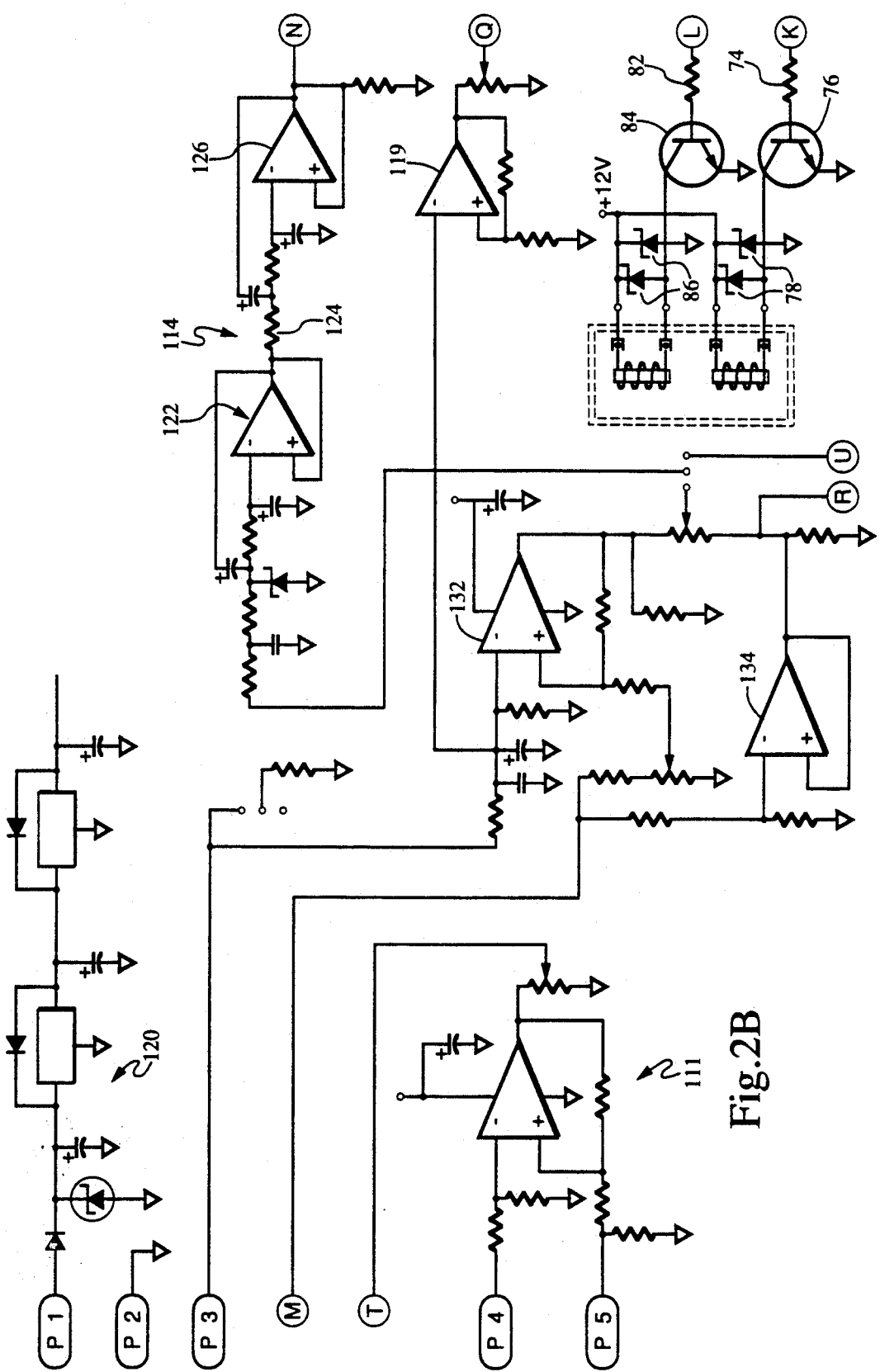
Figure 2C:
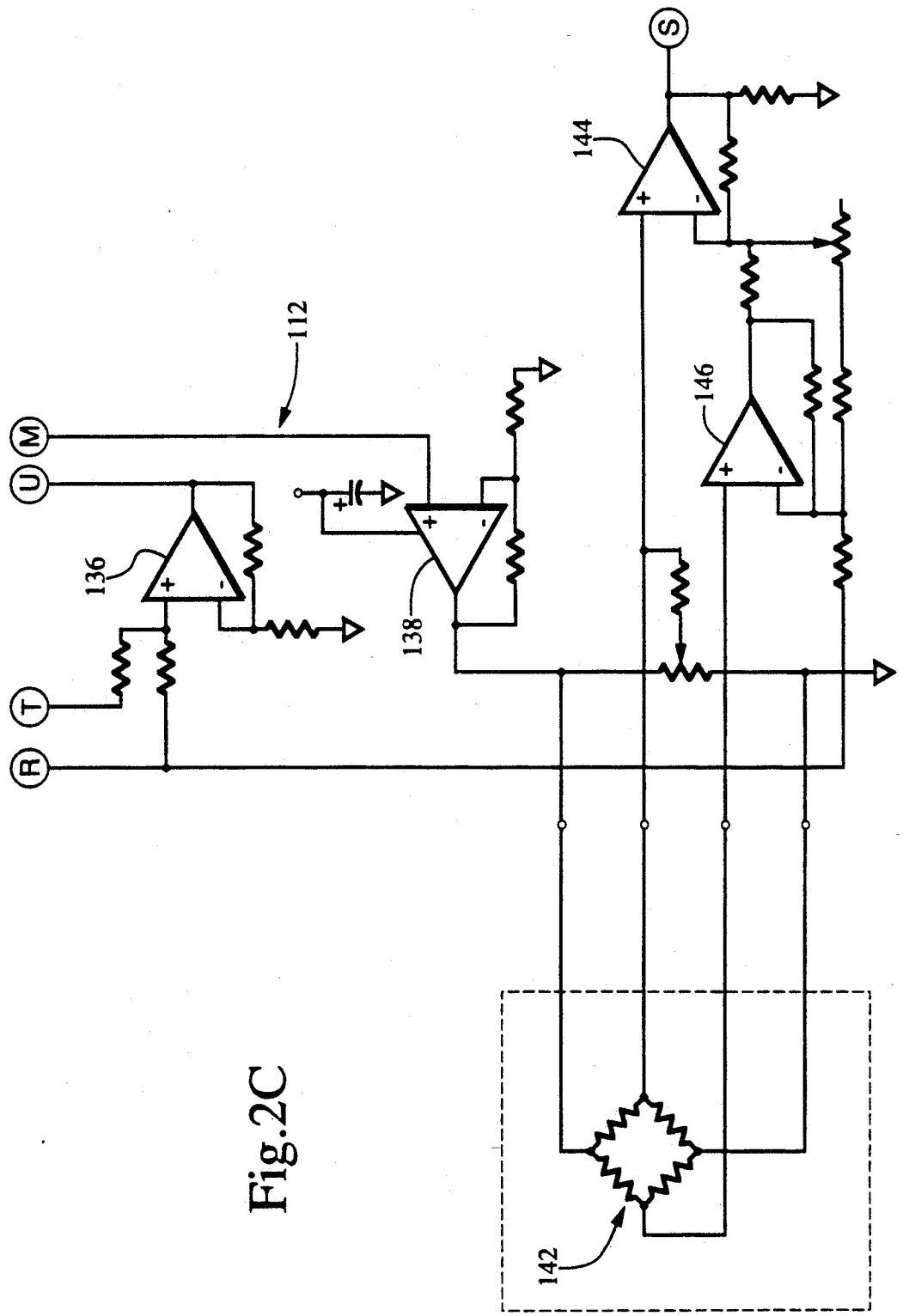

Referring to FIGS. 2A-2C, there is shown circuitry controlling the operation of the regulator controller of FIG. 1. Inputs to the circuitry are provided from a plurality of push-button switches 62 on a membrane board 63 with the individual switches connected to the microprocessor 38. The push-button switches 62 include a down pressure switch 64 to decrease the control pressure to the regulator bonnet, a set switch 66 to set the control pressure, an up switch 68 to increase the control pressure, and a no pressure switch 70 to completely vent the buffer tank 2 and allow no control pressure to the pressure regulator (not shown).

In addition to controlling the solenoid valves 8 and 10, the microprocessor 38 also generates outputs for affecting the function of and displaying information about the regulator controller. The control signal to the control pressure solenoid valve 8 is generated by the microprocessor 38 on a line 72. A resistor 74 in the line 72 is connected to the input of a control transistor 76. The output of the transistor 76 is connected across two zener diodes 78 to the input lines 36 of the control pressure solenoid valve 8. The control signal from the microprocessor 38 for the exhaust solenoid valve 10 is generated by the microprocessor on a line 80. A resistor 82 in the line 80 is connected to the input of a control transistor 84. The output of the transistor 84 is connected across two zener diodes 86 to the input lines 36 of the exhaust solenoid valve 10.

The microprocessor 38 also provides outputs to two LED's 88 located on the membrane board 63. The output lines 8 from the microprocessor 38 for the LED's 88 are connected to the inputs of the two driver transistors 90 through a resistor 92. The output of each transistor 90 connects to one end of an LED 88 having a second terminal connected to resistors 94 in turn connected to a five volt power source 96.

Finally, the microprocessor 38 has several output lines connected to external alarms. Each output to an alarm is connected to the input of a control transistor 106 through a resistor 10B. The output of each transistor 106 goes to an output terminal 110 to which an external alarm is connected.

Figure 3:
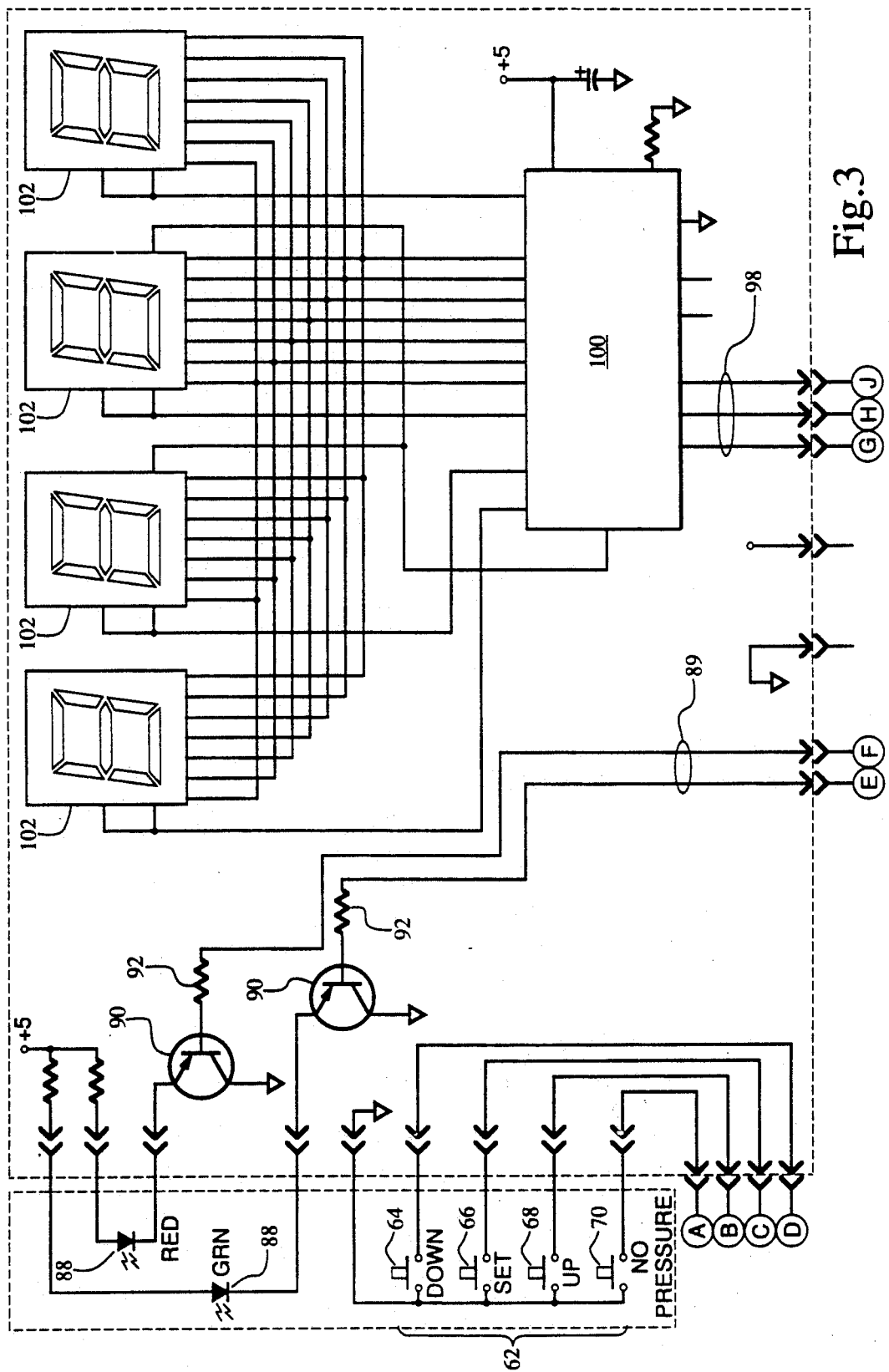
FIG. 3 is a schematic drawing of the circuit for control of the digital display of the controller of FIG. 1.

Referring to FIG. 3, there is shown the circuitry responsive to a digital display signal received from the microprocessor 38. The microprocessor 38 sends data over three lines 98 to a decoder driver 100. Connected to the decoder driver 100 are four digital displays 102 for displaying the present regulator bonnet pressure.

Referring again to FIGS. 2A-2C, the circuitry for the regulator controller includes sub-circuits for operation at a variety of input signal levels. If an input signal of 0-5 milliamperes is used, an input network 111 is connected to a servo-feedback circuit 112 and selectively to an input filter 114, both connected to the microprocessor 38. When an input signal range of 1-5 milliamperes is available, an adjustable milliamp converter 116 connects to the servo-feedback circuit 112 selectively to the input filter 114, both again connected to the microprocessor 38. When the input signal has an operating range of 4-20 milliamperes, the microprocessor 38 is connected to the adjustable milliamp converter 116 through the input filter 114 and the servo-feedback circuit 112. The circuitry of FIGS. 2A-2C also includes a voltage-to-current converter 118 and a voltage regulator 120 of conventional design consisting of interconnected diodes, capacitors and resistor elements. Further description is not considered to benefit an understanding of the invention.

The input filter 114 comprises an amplifier 122 having an output connected through a resistor 124 to the input of amplifier 126. The output of the amplifier 126 is connected to the microprocessor 38 through a resistor 128. A capacitor 130 functions as a filter for the signal that is connected to the microprocessor 38.

The adjustable 4-20 to 1-5 milliamp converter 116 consists of a network of capacitors and resistors connected to the input of an amplifier 132. The output of the amplifier 132 is summed with the output of an amplifier 134 and is input to the servo-feedback circuit 112 and selectively to the input filter 114.

The servo-feedback circuit 112 consists of an amplifier 136 having an input connected to the input network 111 and the output connected to the input filter 114. The servo-feedback 112 further comprises an amplifier 138 having an input connected to the adjustable 4-20 milliamp and 1-5 milliamp converter 116 and has an output connected to a transducer 142. The output terminals of the transducer 142 connect to the inputs of amplifier 144 and amplifier 146. The output of the amplifier 144 is applied as an input to the microprocessor 38. The servo-feedback circuit 112 functions to increase the gain of the circuit.

The voltage-to-current converter 118 receives an input signal from the adjustable milliamp converter 116 through an adjusting network amplifier 119. This input signal is applied to one input of an amplifier 148. The output of the amplifier 148 is connected to the input of a Darlington Pair 149 consisting of a transistor 150 having an output connected to the input of another transistor 152. The output of the second transistor 152 is applied to an output pin 156 and fed back as one input to a feedback amplifier 154.

Figure 4:
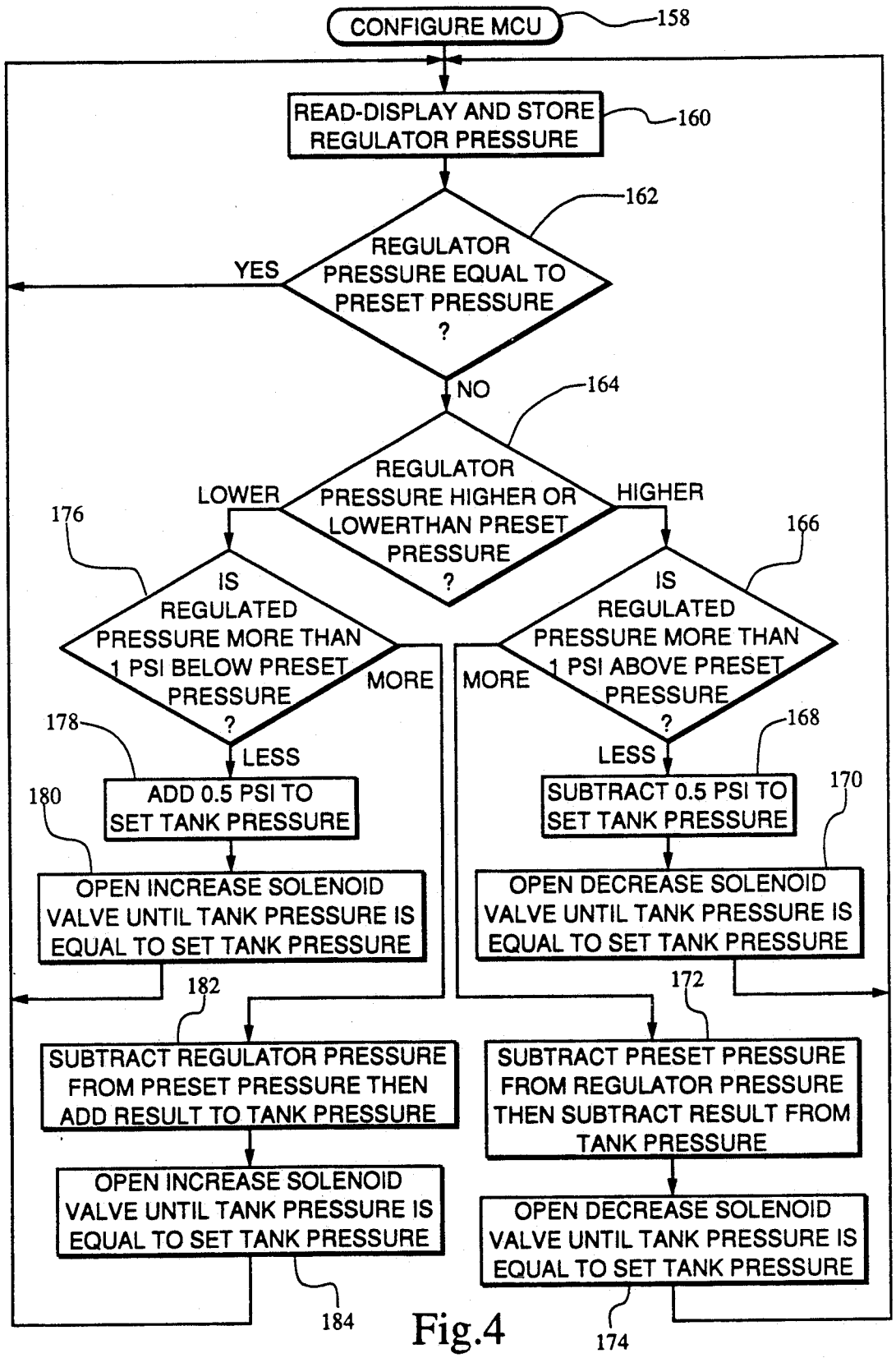
FIG. 4 is a flow chart of the program stored in the microprocessor for setting the controlled regulator pressure to the desired level.

Referring to FIG. 4, there is illustrated by way of a flow chart the process by which the microprocessor 38 controls the regulator bonnet pressure. Initially the microprocessor 38 is configured at step 158, the present regulator bonnet pressure is read, the regulator pressure is displayed on the digital display and stored as the present regulator bonnet pressure in memory at step 160. Next, the microprocessor 38 compares the regulator bonnet pressure to the preset pressure stored in memory at step 162. If the regulator bonnet pressure is equal to the preset pressure, as determined during step 162, the microprocessor 38 continues to read the bonnet pressure and display this read pressure on the digital display at step 160. If the regulator pressure is not equal to the desired preset pressure, the microprocessor 38 tests to determine if the regulator bonnet pressure is higher or lower than the preset pressure at step 164.

If the microprocessor 38 determines that the pressure is higher than the preset pressure during inquiry 164, the microprocessor 38 then determines if the regulated pressure is more or less than one PSI above the preset pressure at test step 166. If the regulator pressure is less than one PSI above the preset pressure, the microprocessor 38 subtracts 0.5 PSI from the preset pressure at step 168. The microprocessor then generates a control signal to the exhaust solenoid valve 10 to open and remain open until the tank pressure equals the preset pressure at step 170. The exhaust solenoid valve 10 then closes and the microprocessor 38 will read the regulator pressure, display it on the digital display at step 160 and compare the regulator pressure to the preset pressure at step, 162.

Returning to step 166, if the regulator pressure is found to be greater than one PSI above the preset pressure at step 166, the preset pressure is subtracted from the regulator bonnet pressure and this result is subtracted from the buffer tank pressure during step 172 by the microprocessor 38. The exhaust solenoid valve 10 is then opened until the buffer tank pressure is equal to the preset pressure at step 174. The new regulator bonnet pressure is then stored, displayed and compared to the preset pressure at steps 160 and 162 until there is need for another change.

If the regulator pressure is lower than the preset pressure at step 164, the microprocessor 38 then determines if the regulator pressure is greater than one PSI below the preset pressure at step 176. If the regulator bonnet pressure is less than one PSI below the preset pressure, 0.5 PSI is added to the buffer pressure at step 178 and the control pressure solenoid valve 8 is opened until the buffer tank pressure is equal to the preset pressure at step 180. If the regulator bonnet pressure is more than one PSI below the preset pressure, the regulator bonnet pressure is subtracted from the preset pressure and this result is added to the buffer tank pressure at step 182. The control pressure solenoid valve 8 is opened until the buffer tank pressure equals the preset pressure at step 184.

Although preferred embodiments of the invention have been illustrated in the accompanying drawings and described in the foregoing Detailed Description, it will be understood that the invention is not limited to the embodiments disclosed but is capable of numerous rearrangements and modifications of parts and elements without departing from the spirit of the invention.

I claim:

1. A pressure regulator controller, the regulator including a bonnet, comprising:
    valve means for controlling a pressure source;
    buffer means having pressure storage means in communication with said valve means;
    means for monitoring the bonnet pressure;
    means for generating a signal indicating the difference between the bonnet pressure and a preset pressure;
    means for controlling the operation of said valve means based on the difference between the bonnet pressure and the preset pressure; and
    means for controlling the rate of change of the pressure within the pressure storage means.

2. The pressure regulator controller of claim 1, wherein said valve means comprises two solenoid valves.

3. The pressure regulator controller of claim 2, wherein said pressure storage means comprises a tank.

4. The pressure regulator controller of claim 1 wherein the buffer means includes a base defining two valve chambers, said base including a plurality of passageways between the pressure storage means, said valve means, and said valve chambers.

5. The pressure regulator controller of claim 4, wherein the means for controlling the rate of change comprises an adjustable valve located in the valve chamber of said base.

6. A pressure regulator controller, the regulator including a bonnet, comprising:
    two valves for controlling a pressure source;
    a buffer tank in communication with said valves;
    means for controlling the operation of said valves;
    a base defining two valve chambers, said base including a plurality of passageways for interconnecting the buffer tank, the valves, and said valve chambers; and
    means for interconnecting said base to the bonnet of the regulator.

7. The pressure regulator controller of claim 6, wherein said means for controlling comprises:
    means responsive to the regulator bonnet pressure;
    means for generating a signal indicating the difference between the regulator bonnet pressure and a preset pressure; and
    means for generating an output signal to the two valves in response to the signal indicating the difference between regulator bonnet pressure and the preset pressure.

8. The pressure regulator controller of claim 7, wherein said means responsive to the regulator pressure includes:
    a digital display; and
    a digital decoder/driver.

9. The pressure regulator controller of claim 7, wherein said means to generate an output signal to the two valves comprises:
    a plurality of input switches;
    means for receiving the signal indicating the difference between the regulator bonnet pressure and the preset pressure;

means for determining if the regulator bonnet pressure is above, below or equal to the preset pressure;

means for determining the amount the regulator bonnet pressure differs from the preset pressure;

means for adding or subtracting the difference between the regulator bonnet pressure and the preset pressure to a preset pressure; and means for generating a signal to equalize the buffer tank pressure and the preset pressure.

10. The pressure regulator controller of claim 6, further including means for generating a signal to a plurality of external alarms.

11. The pressure regulator controller of claim 6, further including means for generating a signal to a plurality of LED's.

12. A method of controlling the pressure in a pressure regulator bonnet comprising the steps of:

determining a present regulator bonnet pressure;

comparing the present regulator bonnet pressure to a preset pressure to determine if the present regulator bonnet pressure is equal to, higher than or lower than, the preset pressure;

generating a control signal in response to the comparison of the present regulator pressure and the preset pressure;

in response to the control signal, establishing a control pressure in a buffer tank;

adjusting the pressure in the buffer tank to equalize the regulator bonnet pressure and the preset pressure.

13. The method of claim 12, further including the step of displaying the present regulator bonnet pressure.

14. The method of claim 12, wherein the step of comparing the present regulator pressure to the preset pressure includes the step of testing if the regulator pressure is within one PSI of the preset pressure.

15. The method of claim 12, further including the step of controlling the rate of change of pressure within the buffer tank.

* * * * *